(12) United States Patent
Maney

(10) Patent No.: US 6,524,054 B2
(45) Date of Patent: Feb. 25, 2003

(54) VEHICULAR MOUNTED LIFT

(76) Inventor: Finus Maney, 1217 Sherbrooke, St. Charles, MO (US) 63303

( * ) Notice: Subject to any disclaimer, the term of this patent is extended or adjusted under 35 U.S.C. 154(b) by 0 days.

(21) Appl. No.: 09/855,791

(22) Filed: May 15, 2001

(65) Prior Publication Data

US 2002/0172581 A1 Nov. 21, 2002

(51) Int. Cl.⁷ .................................................. B60P 9/00
(52) U.S. Cl. ...................................... 414/462; 224/519
(58) Field of Search .......................... 414/462; 224/510, 224/519, 521

(56) References Cited

U.S. PATENT DOCUMENTS

| | | | |
|---|---|---|---|
| 3,713,672 A | 1/1973 | Robbins | |
| 4,325,666 A | 4/1982 | Chain et al. | |
| 4,708,576 A | 11/1987 | Conley | |
| 4,738,581 A | * 4/1988 | Kuhlman | 414/462 |
| 5,011,361 A | * 4/1991 | Peterson | 414/462 |
| 5,137,411 A | * 8/1992 | Eul et al. | 414/462 |
| 5,190,437 A | 3/1993 | Perry | |
| 5,431,522 A | * 7/1995 | Ross | 414/462 |
| 5,567,107 A | * 10/1996 | Bruno et al. | 414/462 |
| 5,590,998 A | 1/1997 | Wilcox | |
| 5,810,542 A | * 9/1998 | Ostrander | 414/462 |
| 5,890,739 A | * 4/1999 | Cogswell | 224/519 |
| 5,950,890 A | * 9/1999 | Darby | 224/519 |
| 5,951,236 A | 9/1999 | Thompson | |
| 6,312,210 B1 | * 11/2001 | Lang | 414/462 |

* cited by examiner

Primary Examiner—Kathy Matecki
Assistant Examiner—Sang Kim
(74) Attorney, Agent, or Firm—Polster, Lieder Woodruff & Lucchesi L.C.

(57) ABSTRACT

A pallet lift or forklift mounted to a consumer vehicle such as an automobile or van. The forklift is secured to a vehicle by a square tow hitch. The forklift is actuated by raising and lowering a jack. The jack is secured to a generally vertical lift post, which is in turn secured to horizontal lift arms. As the jack is actuated, the lift post and the lift arms are raised and lowered.

19 Claims, 4 Drawing Sheets

VEHICULAR MOUNTED LIFT

CROSS-REFERENCE TO RELATED APPLICATIONS

None.

STATEMENT REGARDING FEDERALLY SPONSORED

Not Applicable.

BACKGROUND OF THE INVENTION

This invention relates to forklifts and pallet lifts, specifically to a pallet lift that is mounted to a tow hitch receiver of a vehicle such as an automobile or van.

When large amounts of goods or products are shipped from a manufacturer, distributor, or the like, these goods are often shipped on pallets or skids. Each pallet will hold a certain amount of the product being shipped, the separate units such as boxes or bags being stacked to a predetermined height based on total weight of shipment.

It is not uncommon for some of these goods to be bought by consumers in quantity from a retailer or consumer wholesaler, such as a hardware store, feed store, or the like. However, it can be difficult for the consumer to transport these goods to their homes or whatever other place in which they intend to use the goods. For instance, garden mulch may be sold in forty pound bags, one layer on a pallet being formed of six bags. A consumer buying a large amount of bags, such as thirty, would have several choices in how to transport the mulch bags. However, at present, the only way consumers may move the bags on their own would be to lift each bag into their own vehicle, and then unload them from the vehicle upon arriving at the destination.

Presently, it is known to mount a hydraulic lift on the back end of a light or heavy truck or a forklift on the flat bed of a heavy truck. Use of these, however, is limited to those who rent one or own. As a percentage, few consumers own these vehicles, yet at times, require the delivery of heavy goods shipped in pallets.

Accordingly, it is sought to provide an inexpensive apparatus that a person who ordinarily would not own or use a heavy truck with a mounted forklift may use to transport a pallet or partial pallet of goods.

BRIEF SUMMARY OF THE INVENTION

The present invention resides in a forklift including a mounting tongue, a pair of lift arms insertable into the pallet, and a jack which raises and lowers the lift arms. Preferably, the forklift is removably securable to a vehicle, and preferably the rear end of the vehicle with the lift arms extending rearwardly when in a service position and extending upwardly when in a stored position. Preferably, the forklift is removably attached to a square tow hitch receiver mounted to the vehicle. The jack is rated to lift two tons, though this may vary, and may be hand-operated or hydraulically actuated. The lift arms include extending arms which telescope out from the lift arms.

The forklift also includes a generally vertical or upright lift post, a lift crossbar connected to a lower end of said lift post, the lift arms being connected to ends of the crossbar. The jack includes a base, a ram, and a ram head such that the actuating of the jack raises and lowers the lift post, lift crossbar, and lift arms. The forklift further includes a slide block mounted to the ram head, and a top slide permanently mounted to the slide block and attached to said lift post. The forklift also includes a bottom slide closely fitted around said lift post, the lift post and bottom slide having horizontal holes into which a pin is inserted for greater stability while under load. A second pin is inserted through a hole in the top slide which is aligned to a hole in the lift post for securing the top slide to the lift post.

The crossbar includes a series of holes, as do the lift arms. A pin is inserted into each of the lift arms and into the crossbar to secure the lift arms to the crossbar.

The forklift preferably includes a generally vertical support plate permanently mounted to the mounting tongue, a generally horizontal support plate connected to the vertical support plate, an anterior brace permanently mounted to the vertical support plate and the mounting tongue, and a posterior brace permanently mounted to the vertical support plate and the horizontal support plate. Preferably, the vertical support plate and horizontal support plate are formed integral from a single piece of steel.

Preferably, the forklift includes a block permanently mounted to said horizontal support plate, and the base of the jack is secured to the block. Preferably, the block is permanently mounted to the bottom slide.

The present invention also resides in the combination of a forklift for lifting loads on a pallet and a vehicle to which it is attached. This combination comprises a mounting tongue removably securable to a vehicle, a pair of lift arms insertable into the pallet, and a jack supported by the mounting tongue, such that the actuating of the jack raises and lowers the lift arms. Further, the jack includes a ram head, and the forklift includes a lift post securable to the ram head, a lift crossbar securable to a lower portion of the lift post. The lift arms are removably secured to the lift crossbar.

The foregoing and other objects, features, and advantages of the invention as well as presently preferred embodiments thereof will become more apparent from the reading of the following description in connection with the accompanying drawings.

BRIEF DESCRIPTION OF THE SEVERAL VIEWS OF THE DRAWINGS

In the accompanying drawings which form part of the specification.

Corresponding reference numerals indicate corresponding parts throughout the several figures of the drawings.

DESCRIPTION OF THE PREFERRED EMBODIMENT

The following detailed description illustrates the invention by way of example and not by way of limitation. The description clearly enables one skilled in the art to make and use the invention, describes several embodiments, adaptations, variations, alternatives, and uses of the invention, including what is presently believed to be the best mode of carrying out the invention.

Figure 1:
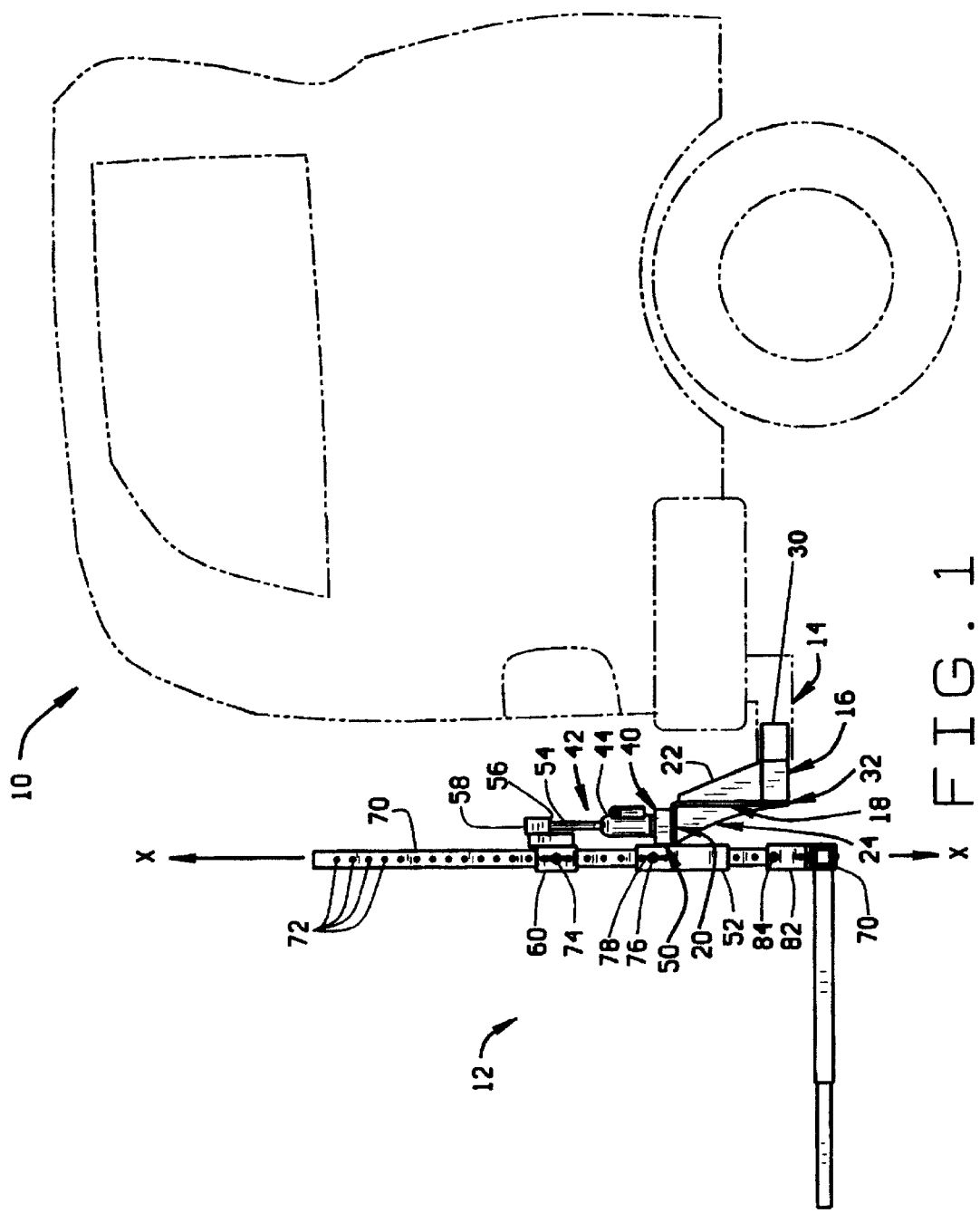
FIG. 1 is a silhouette of a van with a forklift of the present invention attached.

Referring initially to FIG. 1, a silhouette of a van 10 is depicted with the forklift 12 of the present invention attached to a square tow hitch receiver 14. The van 10 is merely for illustrative purposes and can be any consumer vehicle capable of having a square tow hitch receiver 14 attached. Alternatively, the forklift 12 of the present invention could be permanently mounted on the rear end of a van 10 or other vehicle, as well as adapted for other types of tow hitches. As a further alternative, the forklift 12 may be mounted or attached to the front end of a van 10 or other vehicle. As depicted, the forklift 12 is in a service position, that is, it is in a position for holding a pallet of goods or product.

The forklift 12 includes a mounting tongue 16, a vertical support plate 18, a horizontal support plate 20, an anterior brace 22, and a posterior brace 24. The mounting tongue 16 is made of square, steel tubing sized for the square tow hitch receiver 14. As the strength of each component of the forklift 12 is a function of the cost of the steel used to make the forklift 12, one may utilize steel pieces of different internal and cross-sectional dimension producing forklifts 12 of the present invention with different weight ratings. Engineering principles of safety factors should be kept in mind such that each forklift is safe for its rated weight. The distal end 30 of the mounting tongue 16 is inserted into and secured to the square tow hitch reciever 14, typically by a pin (not shown) inserted through aligned holes in both the mounting tongue 16 and the square tow hitch receiver 14. The proximate end 32 of the mounting tongue 16 terminates at the vertical support plate 18. The vertical support plate 18 is generally vertical, though it may be at an angle from the vertical. Nevertheless, it can be characterized as upright. The vertical support plate 18 is permanently mounted to the horizontal support plate 20, and the two plates 18, 20 are preferably formed from a single piece of steel. As used herein, permanently mounted means the pieces are preferably seam welded; however, any conventional means of producing a strong joint may be utilized, as may casting as a single piece, or another method. The anterior brace 22 bridges the span from the mounting tongue 16 and the vertical support plate 18, the anterior brace 22 being permanently mounted to both. The posterior brace 24 bridges the span from the vertical support plate 18 and the horizontal support plate 20, the posterior brace 24 being permanently mounted to both.

On top of the horizontal support plate 20 is a block 40, and a jack 42. The block 40 is permanently mounted to the horizontal support plate 20, and the base 44 of the jack 42 is mounted on top of the block 40. The block 40 is preferably a square tube made of steel. The jack 42 is preferably rated for lifting two tons, and may be manually actuated, hydraulically actuated, or driven by an electric motor. When mounted to van 10 or another vehicle, the weight of the load will create a moment tending to raise the front end of the van 10. It is believed that a two-ton capacity jack will provide enough lifting strength for typical loads to be safely lifted without causing the front of the van 10 to lift off the ground. However, other jacks may be used depending on the vehicle and operating circumstances. The jack 42 may be a conventional hand operated jack, including ratchet or turnscrew jacks, where one has an attachable and detachable jack handle (not shown) used to raise or lower the jack 42. Alternatively, the jack 42 may be a hydraulic, pneumatic, or other type of jack such as an electrically driven jack.

The posterior end 50 of the block 40 is permanently mounted to a vertical bottom slide 52. Again, the block 40 and the bottom slide 52 may be connected by any conventional means while seam welding is preferred. The jack 42 includes a ram 54 extending vertically from the base 44 of the jack 42 and terminating at the ram head 56. The ram head 56 is secured to a slide block 58, the slide block 58 being permanently mounted to a vertical top slide 60. The bottom slide 52 and the top slide 60 are formed of square, steel tubing of identical inner dimension. As the ram 54 is raised or lowered by the jack 42, the top slide 60 is raised or lowered.

The bottom slide 52 and the top slide 60 are vertically aligned on the same central axis X. Located within the bottom slide 52 and the top slide 60 is a vertically oriented lift post 70. The lift post 70 is square steel tubing fitting closely within the bottom slide 52 and the top slide 60 so as to move easily with minimal friction within the slides 52, 60. The lift post 70 has a series of regularly spaced, horizontally aligned holes 72 located laterally along the vertical length of the lift post 70. It is appreciated that the top slide 60 may be permanently mounted or affixed to the lift post 70; however, assembly of the forklift 12 is facilitated by the top slide 60 and lift post 70 not being permanently affixed. Instead, the lift post 70 is preferably secured with a pin 74 passing through the top slide 60 and the lift post 70. Although provision of a single hole 72 for securing the top slide 60 to the lift post 70 may be sufficient, it is preferred that the lift post 70 have a series of holes 72. The jack 42 has a limited range of motion, and provision of a series of holes 72 allows an operator to provide a greater range of lifting positions. In addition, the bottom slide 52 has a hole, at 76, which also aligns with the holes 72 of the lift post 70. When the forklift is bearing a load, a pin 78 provides additional stability to the apparatus and secures the lift post 70 to the bottom slide 52.

Figure 2:
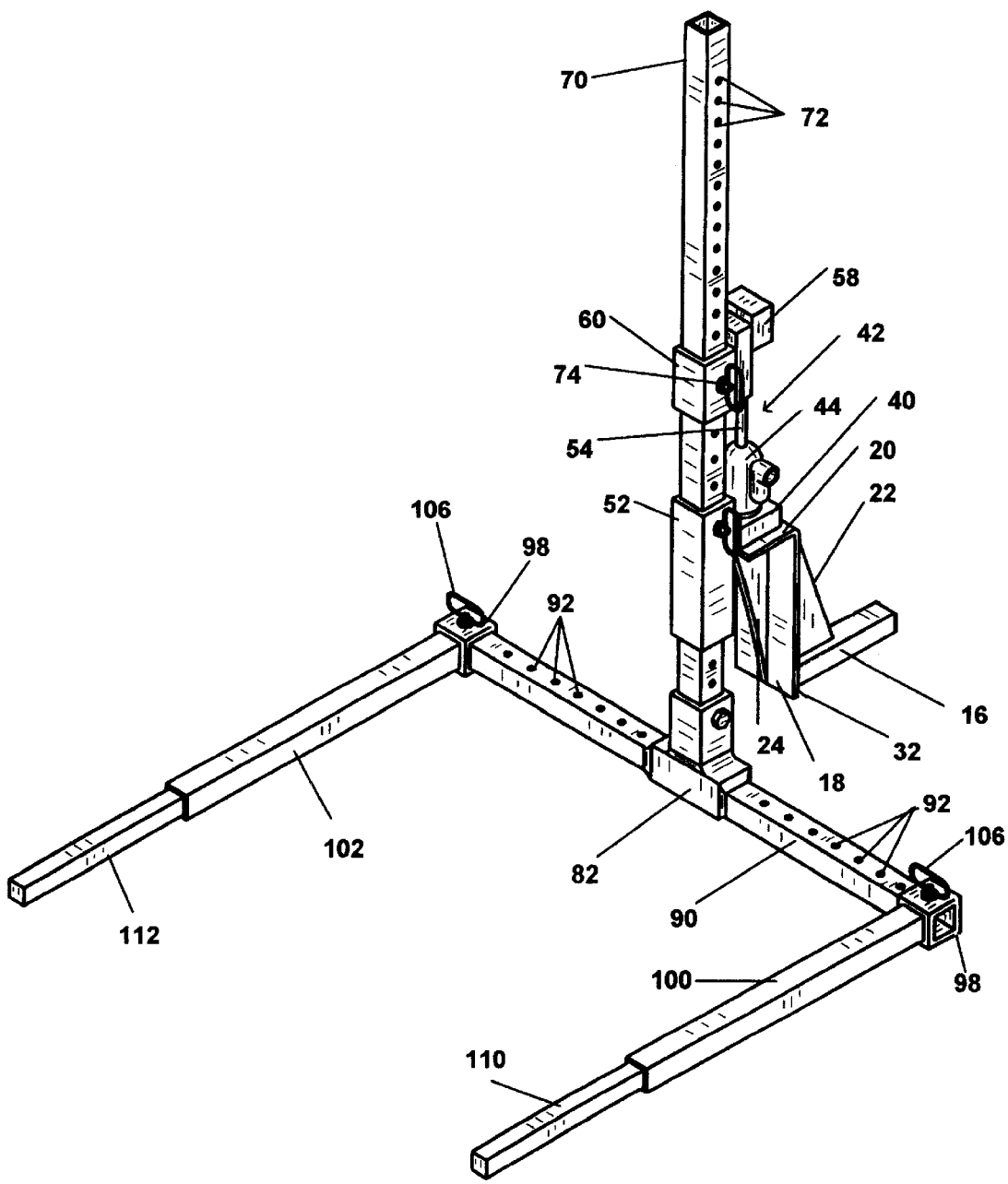
FIG. 2 is a perspective view of the forklift of the present invention in a service position.

As can more easily be seen by reference to FIG. 2, the bottom end 80 of the lift post 70 is secured to a lift bracket 82. The lift bracket 82 fits over the bottom end 80 of the lift post 70 and is secured by a bolt 84 or other securing means that is capable of bearing a transverse load. The lift bracket 82 is permanently mounted to a lift crossbar 90. The lift crossbar 90 has a series of regularly spaced, vertically aligned holes 92. The lift crossbar 90 is square, steel tubing.

Figure 3:
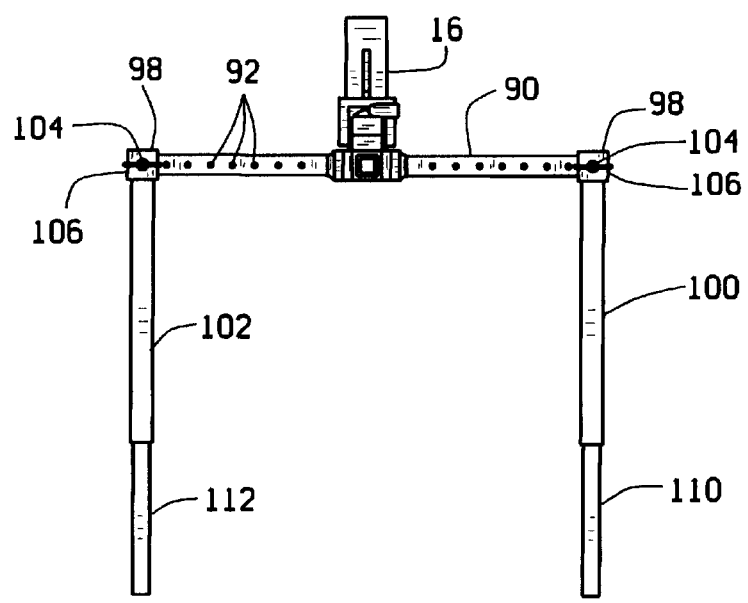
FIG. 3 is a top plan view of the forklift of the present invention in a service position.
Figure 4:
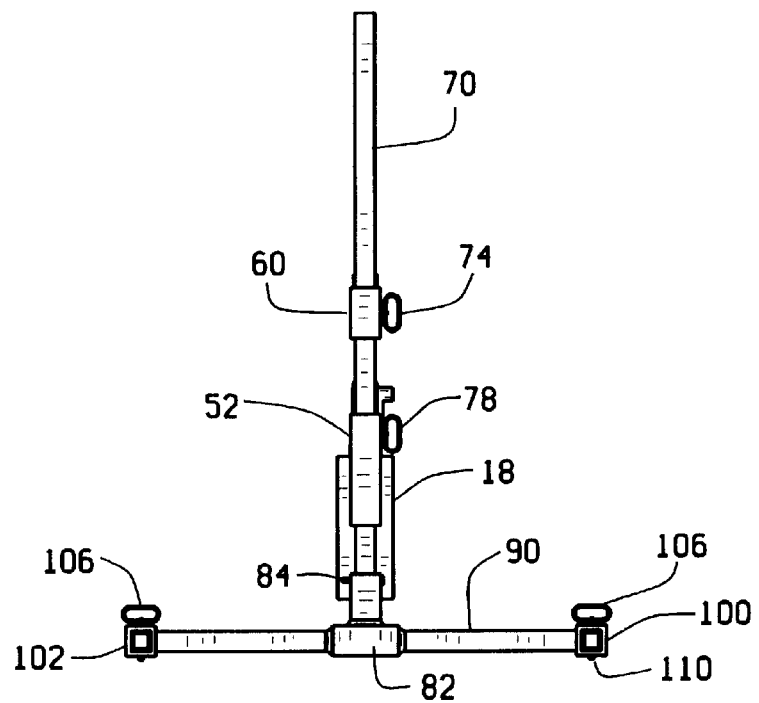
FIG. 4 is a front elevation view of the forklift of the present invention in a service position.
Figure 5:
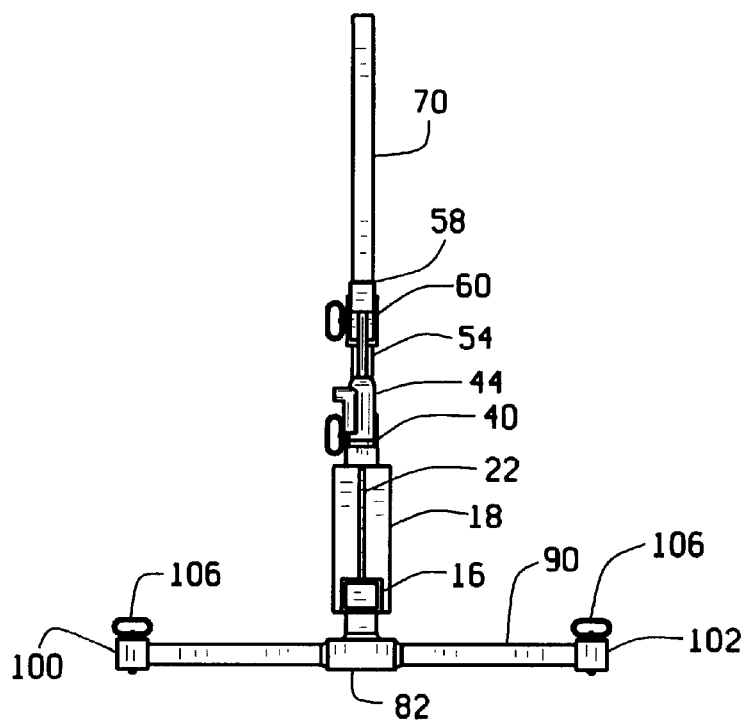
FIG. 5 is a anterior elevation view of the forklift of the present invention in a service position.

Fitted over each end of the lift crossbar 90 is a lift arm bracket 98. Each lift arm bracket 98 is square, steel tubing and fits closely over the lift crossbar 98 while being movable with minimal friction. Permanently mounted to each lift arm bracket 98 are lift arms 100 and 102. When in a service position, the lift arms 100, 102 extend rearwardly. The lift arm brackets 98 have a vertically aligned hole, as at 104, that aligns with the holes 92 of the lift crossbar 90. Pins 106 are placed in holes 104 and 92 as to secure the lift arms 100, 102 and accompanying lift arm brackets 98 to the lift crossbar 90. As can be seen in FIG. 3, each lift arm 100, 102 has a secondary, extending arm 110, 112, each of which fits closely within the respective lift arms 100, 102.

Figure 6:
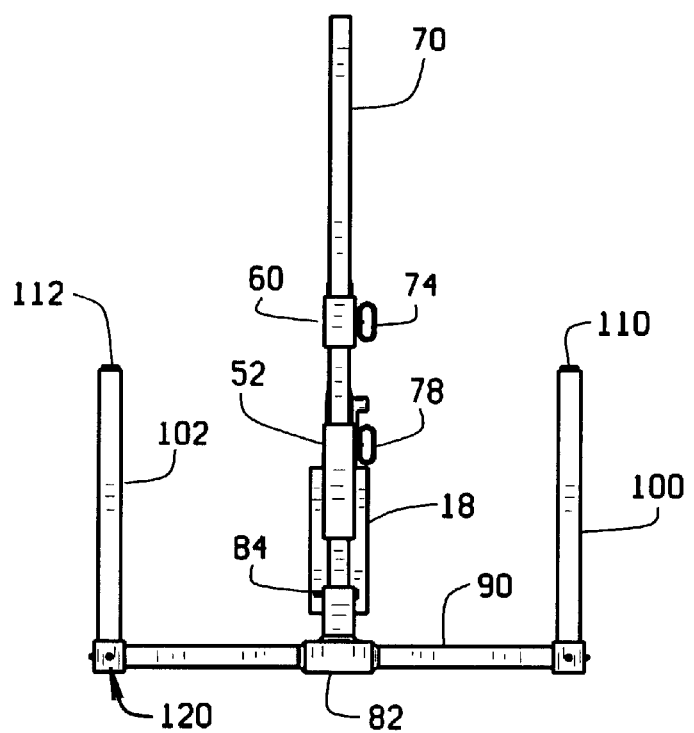
FIG. 6 is a front elevation view of the forklift of the present invention in a stored position.

Referring now to FIG. 6, the forklift 12 is depicted in a storage position. The storage position is the position the forklift 12 is in when the forklift 12 is not being used. The storage position is so that the forklift 12 may be transported on the back of the van 10 or another vehicle while minimizing its potential hazard on the roadways. The lift arms 100, 102 may be removed and then replaced with a vertical orientation, as opposed to the horizontal orientation the lift arms 100, 102 are in when in a service position. The extending arms 110, 112 telescope into the lift arms 100, 102. Horizontally aligned holes are located in the lift crossbar 90, as at 120, for securing the lift arms 100, 102 during transport.

In operation, the forklift 12 initially assumes a service position. In a service position, the lift arms 100, 102 extend rearwardly and may be adjusted laterally for fitting within the slots of a pallet. The van 10 or other vehicle moves in a reverse gear as to guide the lift arms 100, 102 into the slots of a pallet. The extending arms 110, 112 may be extended for additional support and stability. Once the lift arms 100, 102 are in proper position under the pallet and within the slots, the jack 42 is actuated, raising the ram 54, ram head 56, slide block 58, and the top slide 60. As the top slide 60 is secured to the lift post 70, the lift post 70 raises while sliding within the bottom slide 52. Thus, the lift crossbar 90 and lift arms 100, 102 are raised, and the pallet and its accompanying load are raised. As a safety precaution, chains or straps (not shown) may be used to secure the pallet and load.

In view of the above, it will be seen that the several objects of the invention are achieved and other advantageous results are obtained. As various changes could be made in the above constructions without departing from the scope of the invention, it is intended that all matter contained in the above description or shown in the accompanying drawings shall be interpreted as illustrative and not in a limiting sense.

What is claimed is:

1. A forklift for lifting loads on a pallet comprising:
   a mounting tongue;
   a pair of lift arms configured to receive said load, said lift arms movable relative to said mounting tongue;
   a jack operable between said mounting tongue and said lift arms, whereby the actuating of the jack raises and lowers the lift arms
   wherein said forklift is mounted on the rear of a vehicle, and wherein the lift arms extend horizontally from said vehicle when in a service position; and
   wherein the lift arms may be removed and re-secured to the forklift so the lift arms extend vertically when in a stored position.

2. The forklift of claim 1 wherein the forklift is removably attached to the vehicle when in use.

3. The forklift of claim 1 wherein the forklift is removably attached to a tow hitch receiver mounted to the vehicle.

4. The forklift of claim 1 wherein the jack is rated to lift two tons.

5. The forklift of claim 1 wherein the jack is hand-operated.

6. The forklift of claim 1 wherein the jack is hydraulically actuated.

7. The forklift of claim 1 wherein the jack is pneumatically actuated.

8. The forklift of claim 1 wherein the jack is electrically actuated.

9. The forklift of claim 1 wherein each of said lift arms includes an extending arm configured for telescoping extension out from said lift arm.

10. The forklift of claim 1 wherein the forklift further includes
    a generally vertical lift post;
    a lift crossbar connected to a lower end of said lift post, said lift arms being connected to ends of the crossbar; and
    wherein said jack includes a base, a ram, and a ram head, whereby the actuating of the jack raises and lowers the lift post, lift crossbar, and lift arms.

11. The forklift of claim 10 wherein the forklift further includes:
    a slide block mounted to the ram head; and
    a top slide permanently mounted to the slide block, said top slide being attached to said lift post.

12. The forklift of claim 11 wherein the lift post includes a series of horizontal holes, wherein said top slide has a horizontal hole, and wherein said forklift includes a pin inserted into said holes for securing said top slide to said lift post.

13. The forklift of claim 10 wherein the forklift further includes a bottom slide closely fitted around said lift post.

14. The forklift of claim 13 wherein the bottom slide has a horizontal hole, and wherein said lift post has at least one horizontal hole, said forklift further including a pin inserted into said holes for stability.

15. The forklift of claim 10 wherein said forklift includes a pin, wherein said lift crossbar includes a series of holes, and wherein said lift arms include a hole such that said pin is inserted into said holes to secure said lift arms to said lift crossbar.

16. The forklift of claim 10 wherein the forklift further includes:
    a generally vertical support plate permanently mounted to said mounting tongue;
    a generally horizontal support plate connected to said vertical support plate;
    an anterior brace permanently mounted to said vertical support plate and said mounting tongue; and
    a posterior brace permanently mounted to said vertical support plate and said horizontal support plate.

17. The forklift of claim 16 wherein said vertical support plate and said horizontal support plate are formed integral from a single piece of steel.

18. The forklift of claim 16 wherein the forklift further includes a block permanently mounted to said horizontal support plate, and wherein said base of said jack is secured to said block.

19. The forklift of claim 18 wherein said block is permanently mounted to said bottom slide.

\* \* \* \* \*